US011704773B2

United States Patent
Zhang et al.

(10) Patent No.: US 11,704,773 B2
(45) Date of Patent: Jul. 18, 2023

(54) AUTOMATIC ORIENTATION METHOD FOR THREE-DIMENSIONAL RECONSTRUCTED SPECT IMAGE TO STANDARD VIEW

(71) Applicant: ZHEJIANG LAB, Zhejiang (CN)

(72) Inventors: Duo Zhang, Hangzhou (CN); Wentao Zhu, Hangzhou (CN); Ling Chen, Hangzhou (CN); Fan Rao, Hangzhou (CN); Bao Yang, Hangzhou (CN); Hui Shen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/712,080

(22) Filed: Apr. 2, 2022

(65) Prior Publication Data

US 2022/0222779 A1     Jul. 14, 2022

Related U.S. Application Data

(63) Continuation of application No. PCT/CN2021/073681, filed on Jan. 26, 2021.

(30) Foreign Application Priority Data

Sep. 21, 2020 (CN) .......................... 202010993876.6

(51) Int. Cl.
*G06T 3/60* (2006.01)
*G06T 11/00* (2006.01)
*G06N 3/045* (2023.01)

(52) U.S. Cl.
CPC .............. *G06T 3/60* (2013.01); *G06N 3/045* (2023.01); *G06T 11/006* (2013.01); *G06T 2207/20084* (2013.01); *G06T 2210/41* (2013.01)

(58) Field of Classification Search
CPC ..... G06T 3/60; G06T 11/006; G06T 2210/41; G06T 2207/20084; G06N 3/0454
See application file for complete search history.

(56) References Cited

U.S. PATENT DOCUMENTS

| 2011/0115485 A1 | 5/2011 | Subbarao |
| 2019/0378311 A1 | 12/2019 | Mailhe et al. |
| 2022/0215601 A1* | 7/2022 | Massanes Basi ..... G06T 11/005 |

FOREIGN PATENT DOCUMENTS

| CN | 102047295 A | 5/2011 |
| CN | 110546711 A | 12/2019 |

(Continued)

OTHER PUBLICATIONS

Vigneault et al., "Ω-Net (Omega-Net): Fully automatic, multi-view cardiac MR detection, orientation, and segmentation with deep neural networks", May 2018, Elsevier, Medical Image Analysis vol. 48, p. 95-106. (Year: 2018).*

(Continued)

*Primary Examiner* — Vincent Rudolph
*Assistant Examiner* — Timothy Choi
(74) *Attorney, Agent, or Firm* — W&G Law Group

(57) ABSTRACT

Disclosed is an automatic reorientation method from an SPECT three-dimensional reconstructed image to a standard view, wherein a rigid registration parameter P between a SPECT three-dimensional reconstructed image A and a standard SPECT image R is extracted by using a rigid registration algorithm to form a mapping database of A and P; features of the image A are extracted by using a three-layer convolution module, and are converted into a 6-dimensional feature vector T after three times of full connection, and T is applied to A through a spatial transformer network to form an orientation result predicted by the network, thus establishing the automatic reorientation model of the SPECT three-dimensional reconstructed image. The SPECT three-dimensional reconstructed image to be orientated is taken as an input. A standard view can be obtained by using the automatic reorientation model of the SPECT three-dimensional reconstructed image for automatic turning.

7 Claims, 1 Drawing Sheet

(56) References Cited

FOREIGN PATENT DOCUMENTS

| CN | 110827335 | A | | 2/2020 | |
|---|---|---|---|---|---|
| CN | 10986949 | | * | 4/2020 | ............... G06N 3/08 |
| CN | 111325686 | A | | 6/2020 | |
| CN | 111862320 | A | | 10/2020 | |

OTHER PUBLICATIONS

He et al., "Deep Residual Learning for Image Recognition", Jun. 2016, IEEE, 2016 IEEE Conference on Computer Vision and Pattern Recognition (CVPR), p. 770-778. (Year: 2016).*

Koay et al., "Three-Dimensional Analytical Magnetic Resonance Imaging Phantom in the Fourier Domain", Jul. 2007, Wiley, Magnetic Resonance in Medicine, vol. 58, p. 430-436. (Year: 2007).*

Sudre et al., "Generalised Dice Overlap as a Deep Learning Loss Function for Highly Unbalanced Segmentations", Sep. 2017, Springer, ML-CDS 2017: Deep Learning in Medical Image Analysis and Multimodal Learning for Clinical Decision Support, p. 240-248. (Year: 2017).*

Wright et al., "LSTM Spatial Co-transformer Networks for Registration of 3D Fetal US and MR Brain Images", Sep. 2018, Springer, DATRA 2018: Data Driven Treatment Response Assessment and Preterm, Perinatal, and Paediatric Image Analysis, p. 149-159 (Year: 2018).*

International Search Report (PCT/CN2021/073681); dated Jun. 24, 2021.

CN First Office Action(202010993876.6); dated Nov. 5, 2020.

CT image reconstruction algorithm of region interest based on global variance; Date of Mailing: Dec. 31, 2019.

Automated Cardiac Pose Computation from Reconstructed Myocardial SPECT Images; Date of Mailing: Feb. 21, 2012.

* cited by examiner

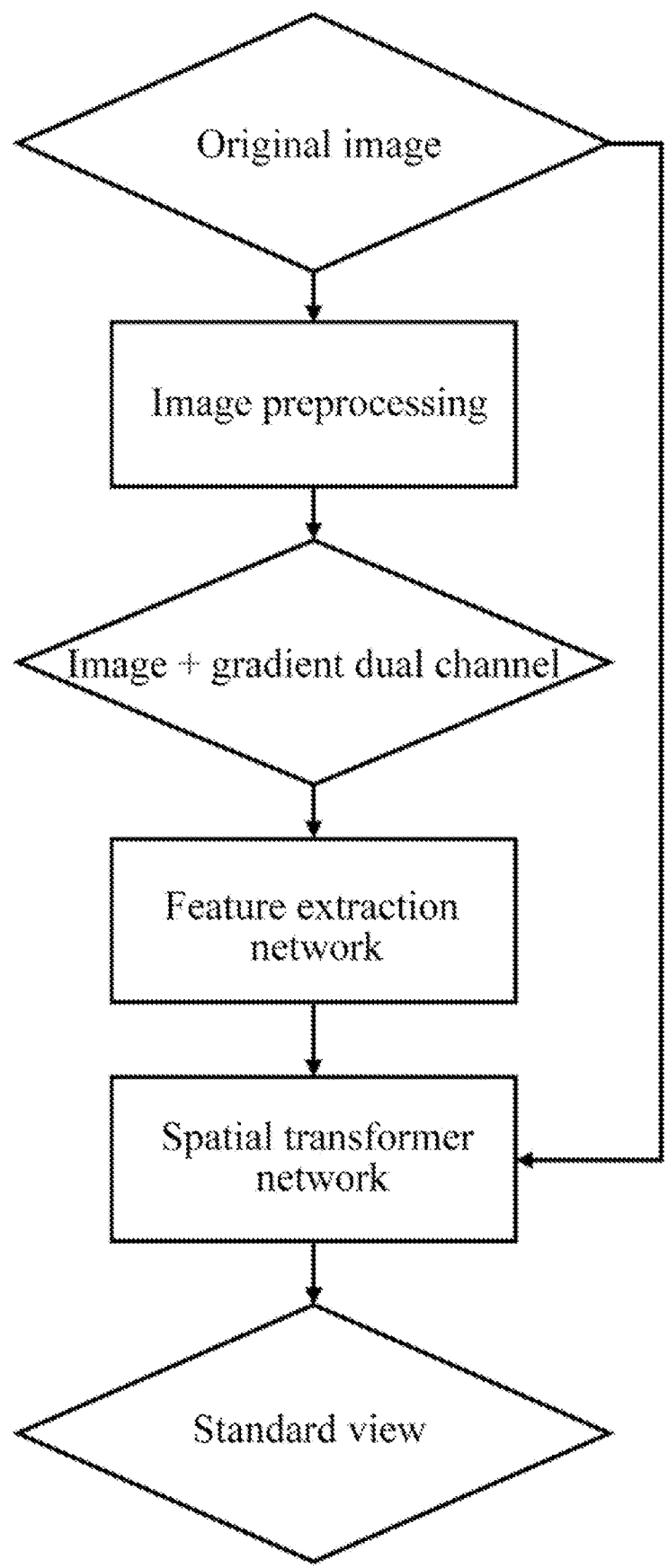

AUTOMATIC ORIENTATION METHOD FOR THREE-DIMENSIONAL RECONSTRUCTED SPECT IMAGE TO STANDARD VIEW

CROSS-REFERENCE TO RELATED APPLICATIONS

The present application is a continuation of International Application No. PCT/CN2021/073681, filed on Jan. 26, 2021, which claims priority to Chinese Application No. 202010993876.6, filed on Sep. 21, 2020, the contents of both of which are incorporated herein by reference in their entireties.

TECHNICAL FIELD

The present application relates to the field of medical imaging and deep learning, in particular to an automatic reorientation method from a SPECT left ventricular image to a standard view based on deep learning network.

BACKGROUND

Potential cardiac defects that have not caused structural changes can be detected by SPECT cardiac imaging, and more detailed functional activity information of the myocardial tissue can be provided. It is an important imaging method for diagnosis, curative effect evaluation and prognosis judgment of coronary heart diseases at present. At present, the most commonly used analysis methods in clinical diagnosis of cardiac nuclear medicine are quantitative analysis indexes based on polar map analysis and left ventricular ejection coefficient analysis.

These methods need to rotate the left ventricle on the cardiac reconstructed image to obtain the standard cardiac view and then make quantitative analysis. The SPECT cardiac reconstructed image is based on the human coordinate system, and the original image obtained clinically is the transverse thoracic section perpendicular to the human body length axis. Because the long axis of the left ventricle is not parallel to the long axis of the human body, it is obviously impossible to directly use this image to directly prepare the polar map for subsequent quantitative analysis. Clinically, it is necessary for doctors to manually transfer images from the conventional view to the standard view of the heart for clinical analysis. Random errors tend to be introduced in this subjective operation and the accuracy of analysis may be affected, and it takes a long time for manual operation.

SUMMARY

The purpose of the present application is to provide a method based on deep learning network to quickly realize automatic reorientation of a SPECT left ventricular image to a standard view.

The purpose of the present application is realized by the following technical solution: an automatic reorientation method from an SPECT three-dimensional reconstructed image to a standard view, wherein the SPECT three-dimensional reconstructed image to be rotated is taken as an input, the standard view is obtained by using an automatic reorientation model of the SPECT three-dimensional reconstructed image for automatic reorientation; wherein the automatic reorientation model of the SPECT three-dimensional reconstructed image includes a feature extraction network and a spatial transformer network composed of a convolution module and a fully connected layer, and training of the SPECT three-dimensional reconstructed image automatic reorientation model includes the following steps:

Step 1, acquiring a SPECT three-dimensional reconstructed image A and a corresponding standard SPECT image S for clinical analysis after reorientation, and extracting a rigid registration parameter P between the SPECT three-dimensional reconstructed image A and the standard SPECT image S to form a mapping database of the SPECT three-dimensional reconstructed image A, the rigid registration parameter P and the standard SPECT image S; wherein, the rigid registration parameter P includes translation parameters in three directions and rotation angle parameters in three angles.

Step 2, inputting the SPECT three-dimensional reconstructed image A into the feature extraction network, using the convolution module to extract features of the SPECT three-dimensional reconstructed image A, and converting the features into a 6-dimensional feature vector T through full connection.

Step 3, applying the feature vector T to the SPECT three-dimensional reconstructed image A by using the spatial transformer network to obtain a predicted image B.

Step 4, constructing an image loss function L-img between the predicted image B and the standard SPECT image S and a parameter loss function L-par between the feature vector T and the rigid registration parameter P, and training and optimizing the network to obtain the best and most robust automatic reorientation model for the SPECT three-dimensional reconstructed image.

Furthermore, both the convolution module and the fully connected layer have three layers, and each convolution module includes a convolution layer and a pooling layer.

Furthermore, an establishment process of the mapping database is as follows: acquiring the SPECT three-dimensional reconstructed images A of n different persons and the corresponding standard SPECT images S after reorientation, and generating m groups of corresponding three-dimensional images, in a form of data augmentation, by translating and rotating the SPECT three-dimensional reconstructed images A without changing the corresponding standard SPECT images S, wherein, n and m are positive integers, and m>n; calculating six rigid registration parameters P of each group of corresponding SPECT three-dimensional reconstructed image A to the standard SPECT image S as label values by using image registration software, wherein the six parameters are translation parameters in three directions and rotation angle parameters in three angles, P=[tx, ty, tz, β, α, γ].

Furthermore, the input of the feature extraction network further includes a gradient map an input image.

Furthermore, the step 3 includes:

Dividing the feature vector T into a displacement matrix M=[tx, ty, tz] and a rotation matrix R=[β, α, γ], and converting R from an Euler angle to a world coordinate system parameter:

$$R(\beta, \alpha, \gamma) = R_y(\alpha) R_x(\beta)$$

$$R_y(\gamma) = \begin{bmatrix} \cos\alpha & 0 & \sin\alpha \\ 0 & 1 & 0 \\ -\sin\alpha & 0 & \cos\alpha \end{bmatrix} \begin{bmatrix} 1 & 0 & 0 \\ 0 & \cos\beta & -\sin\beta \\ 0 & \sin\beta & \cos\beta \end{bmatrix} \begin{bmatrix} \cos\gamma & -\sin\gamma & 0 \\ \sin\gamma & \cos\gamma & 0 \\ 0 & 0 & 1 \end{bmatrix}$$

Reconstructing a transformation matrix $T'=[R\ M^T]$, and inputting the SPECT three-dimensional reconstructed image A, and the transform matrix T'=[R M$^T$] into the spatial transformer network to obtain the predicted image B output by the network.

Furthermore, in the step 4, the image loss function L-img and the parameter loss function L-par are combined to construct an overall joint loss function L: L=δL-par+L-img, where δ is a weight coefficient with a value of 0.3.

Furthermore, the image loss function L-img adopts a Dice-loss loss function.

Furthermore, the parameter loss function L-par adopts an absolute value loss function L1 or a norm loss function L2.

Furthermore, the parameter loss function of a rotation angle is expressed as:

$$L2_\theta = 1/2(\Omega(\theta-\bar{\theta}))^2$$

Where $\Omega(\sim)=\mathrm{mod}(\sim+\pi, 2\pi)-\pi$, θ is the rotation angle in the feature vector T, and $\bar{\theta}$ represents a true value of the rotation angle.

The present application has the beneficial effects that by establishing the matching data set from a SPECT heart image to a clinical standard view and a deep learning-based reorientation network, the present application realizes the automatic reorientation from an SPECT heart image of a conventional view to a clinical standard view, and improves the operation convenience and accuracy of clinical processing and analysis.

BRIEF DESCRIPTION OF DRAWINGS

FIG. 1 is a schematic diagram of the flow of automatic reorientation of an SPECT three-dimensional reconstructed image of the present application.

DESCRIPTION OF EMBODIMENTS

The present application will be described in detail below with reference to the accompanying drawings.

The present application provides an automatic reorientation method from a SPECT left ventricular image to a standard view based on deep learning network, which includes: extracting rigid registration parameter features from the original SPECT chest three-dimensional reconstructed image by constructing an automatic reorientation model of a SPECT three-dimensional reconstructed image, and automatically orientate the SPECT three-dimensional reconstructed image to obtain the standard view by using the extracted rigid registration parameter features, with the process as shown in FIG. 1, wherein, the construction and training of the automatic reorientation model of the SPECT three-dimensional reconstructed image includes the following steps:

Step 1, acquiring a SPECT three-dimensional reconstructed image A and a corresponding standard SPECT image S for clinical analysis after reorientation, and extracting a rigid registration parameter P between the SPECT three-dimensional reconstructed image A and the standard SPECT image S to form a mapping database of the SPECT three-dimensional reconstructed image A, the rigid registration parameter P and the standard SPECT image S; preferably, the establishment process is as follows: the database includes SPECT chest three-dimensional reconstructed images A of n (400 in this embodiment) different people and the corresponding standard three-dimensional views R, after reorientation, and m (8000 in this embodiment) groups of corresponding three-dimensional images are generated in a form of data augmentation by translating and rotating the images A while keeping the corresponding images R unchanged; a rigid registration algorithm or image registration software is used to calculate six rigid registration parameters P of each group of corresponding images A to images R as label values, and the six parameters are translation parameters in three directions and rotation angle parameters in three angles, P=[tx, ty, tz, β, α, γ].

Step 2: inputting the SPECT three-dimensional reconstructed image A into the feature extraction network, using the convolution module to extract features of the SPECT three-dimensional reconstructed image A, and converting the features into a 6-dimensional feature vector T through full connection; preferably, the input of the convolution module also includes a gradient map of the input image, that is, the input layer of the feature extraction network simultaneously receives the input image data and the gradient map of the input image; feature extraction is carried out on the two-channel integrated input image through three layers of convolution modules; each convolution module includes a convolution layer and a pooling layer; the extracted feature vector is input into the fully connected layer; after full connection of the three layers, the feature map is transformed into a 6-dimensional feature vector T, which is used as a comparison with the label value to optimize the feature extraction network and at the same time as the input of the subsequent spatial transformer network; Table 1 shows an example structure of the feature extraction network:

TABLE 1

Structural parameters of the feature extraction network.

| Name of the network layer | Details |
|---|---|
| Input image | 128*128*128*2 (channel) |
| Convolution layer 1 | [3*3*3, 16], stride = 1, padding = 1 |
| | [3*3*3, 16], stride = 1, padding = 1 |
| | Maximum pool layer 1 |
| Convolution layer 2 | [3*3*3, 32], stride = 1, padding = 1 |
| | [3*3*3, 32], stride = 1, padding = 1 |
| | Maximum pool layer 2 |
| Convolution layer 3 | [3*3*3, 64], stride = 1, padding = 1 |
| | [3*3*3, 64], stride = 1, padding = 1 |
| | [3*3*3, 64], stride = 1, padding = 1 |
| | Maximum pool layer 3 |
| | Fully connected layer 1, 512 |
| | Fully connected layer 2, 128 |
| | Fully connected layer 3, 6 |
| | Output to the spatial transformer network |

Step 3, applying the feature vector T to the SPECT three-dimensional reconstructed image A by using the spatial transformer network to obtain a predicted image B; the specific operation is as follows:

Firstly, the extracted 6-dimensional feature vector T is converted into a parameter form accepted by the spatial transformer network, and the specific operation is as follows:

The feature vector T is divided into a displacement matrix M=[tx, ty, tz] and a rotation matrix R=[β, α, γ], and R is converted from an Euler angle to the world coordinate system:

$$R(\beta, \alpha, \gamma) = R_y(\alpha)R_x(\beta)$$

$$R_y(\gamma) = \begin{bmatrix} \cos\alpha & 0 & \sin\alpha \\ 0 & 1 & 0 \\ -\sin\alpha & 0 & \cos\alpha \end{bmatrix} \begin{bmatrix} 1 & 0 & 0 \\ 0 & \cos\beta & -\sin\beta \\ 0 & \sin\beta & \cos\beta \end{bmatrix} \begin{bmatrix} \cos\gamma & -\sin\gamma & 0 \\ \sin\gamma & \cos\gamma & 0 \\ 0 & 0 & 1 \end{bmatrix}$$

Then the transformation matrix of the spatial transformer network is T'=[R M$^T$].

Next, the SPECT three-dimensional reconstructed image A, and the transformation matrix T'=[R M$^T$] are input into the spatial transformer network to obtain the predicted image B output by the network.

Step 4, constructing an image loss function L-img between the predicted image B and the standard SPECT image S and a parameter loss function L-par between the feature vector T and the rigid registration parameter P, and training and optimizing the network to obtain the best and most robust automatic reorientation model of the SPECT three-dimensional reconstructed image; the specific implementation is divided into the following sub-steps:

(4.1) A loss matrix of the reorientation model is a regression mapping based on the input image to the rigid registration parameter P; in order to constrain the accuracy of the image after reorientation, the overall loss matrix is designed as a joint loss function L=δ L-par+L-img of the parameter loss L-par and the image loss L-img, where δ is a weight coefficient, which can be generally set to 0.3 according to experience.

(4.2) When calculating the image loss function L-img of the output image, binary images will be used and Dice-loss between images will be used as the image domain loss function to constrain the learning direction of the network.

(4.3) When calculating the parameter loss function L-par of the registration parameter P, an absolute value loss function L1 or a norm loss function L2 is adopted, since the range of the angle parameters β, α, γ is −π to +π, if the initial predicted value is −π while the real value is +π, there will be a high false value, which will affect the convergence of the network; to solve this problem, the following adjustments will be made to the three angle parameters θ=[β, α, γ] when calculating the loss function, so as to constrain the difference between the calculated value and the true value from −π to +π to optimize the learning situation of the loss function:

$$L2_\theta = 1/2(\Omega(\theta-\overline{\theta}))^2$$

Where $\Omega(\sim)$=mod($\sim$+π, 2π)−π, θ is the rotation angle in the feature vector T, and $\overline{\theta}$ represents the true value of the rotation angle.

The above examples are used to explain, not to limit, the present application. Any modifications and changes made to the present application within the spirit of the present application and the scope of protection of the claims will fall within the scope of protection of the present application.

What is claimed is:

1. An automatic turning method from an SPECT three-dimensional reconstructed image to a standard view, wherein the SPECT three-dimensional reconstructed image to be orientated is taken as an input, the standard view is obtained by using an automatic reorientation model of the SPECT three-dimensional reconstructed image for automatic reorientation ; wherein the automatic reorientation model of the SPECT three-dimensional reconstructed image comprises a feature extraction network and a spatial transformer network composed of a convolution module and a fully connected layer, and training of the SPECT three-dimensional reconstructed image automatic reorientation model comprises the following steps:

step 1, acquiring a SPECT three-dimensional reconstructed image A and a corresponding standard SPECT image S for clinical analysis after reorientation , and extracting a rigid registration parameter P between the SPECT three-dimensional reconstructed image A and the standard SPECT image S to form a mapping database of the SPECT three-dimensional reconstructed image A, the rigid registration parameter P and the standard SPECT image S, wherein the rigid registration parameter P comprises translation parameters in three directions and rotation angle parameters in three angles;

step 2, inputting the SPECT three-dimensional reconstructed image A into the feature extraction network, using the convolution module to extract features of the SPECT three-dimensional reconstructed image A, and converting the features into a 6-dimensional feature vector T through full connection;

step 3, applying the feature vector T to the SPECT three-dimensional reconstructed image A by using the spatial transformer network to obtain a predicted image B; and step 4, constructing an image loss function L-img between the predicted image B and the standard SPECT image S and a parameter loss function L-par between the feature vector T and the rigid registration parameter P, and training and optimizing the network to obtain the best and most robust automatic reorientation model of the SPECT three-dimensional reconstructed image;

wherein the input of the feature extraction network further comprises a gradient map of an input image; and wherein in the step 4, the image loss function L-img and the parameter loss function L-par are combined to construct an overall joint loss function L:L=δL-par+L-img, where δ is a weight coefficient with a value of 0.3.

2. The automatic reorientation method according to claim 1, wherein both the convolution module and the fully connected layer have three layers, and each convolution module comprises a convolution layer and a pooling layer.

3. The automatic reorientation method according to claim 1, wherein an establishment process of the mapping database is as follows: acquiring the SPECT three-dimensional reconstructed images A of n different persons and the corresponding standard SPECT images S after reorientation, and generating m groups of corresponding three-dimensional images, in a form of data augmentation, by translating and rotating the SPECT three-dimensional reconstructed images A without changing the corresponding standard SPECT images S, wherein n and m are positive integers, and m>n;

calculating six rigid registration parameters P of each group of corresponding SPECT three-dimensional reconstructed image A to the standard SPECT image S as label values by using image registration software, wherein the six parameters are translation parameters in three directions and rotation angle parameters in three angles, P=[$t_x$, $t_y$, $t_z$, β, α, γ].

4. The automatic reorientation method according to claim 1, wherein the step 3 comprises:

dividing the feature vector T into a displacement matrix M=[$t_x$, $t_y$, $t_z$] and a rotation matrix R=[β, α, γ], and converting R from an Euler angle to a world coordinate system parameter:

$$R(\beta, \alpha, \gamma) = R_y(\alpha)R_x(\beta)$$

$$R_y(\gamma) = \begin{bmatrix} \cos\alpha & 0 & \sin\alpha \\ 0 & 1 & 0 \\ -\sin\alpha & 0 & \cos\alpha \end{bmatrix} \begin{bmatrix} 1 & 0 & 0 \\ 0 & \cos\beta & -\sin\beta \\ 0 & \sin\beta & \cos\beta \end{bmatrix} \begin{bmatrix} \cos\gamma & -\sin\gamma & 0 \\ \sin\gamma & \cos\gamma & 0 \\ 0 & 0 & 1 \end{bmatrix}$$

reconstructing a transformation matrix T'=[R M$^T$], and inputting the SPECT three-dimensional reconstructed image A and the transform matrix T'=[R M$^T$] into the spatial transformer network to obtain the predicted image B as the output of the network.

5. The automatic reorientation method according to claim 1, wherein the image loss function L-img adopts a Dice-loss loss function.

6. The automatic reorientation method according to claim 1, wherein the parameter loss function L-par adopts an absolute value loss function L1 or a norm loss function L2.

7. The automatic reorientation method according to claim 6, wherein the parameter loss function of a rotation angle is expressed as:

$$L2_\theta = 1/2(\Omega(\theta - \bar{\theta}))^2$$

where $\Omega(\sim) = \mathrm{mod}(\sim + \pi, 2\pi) - \pi$, $\theta$ is the rotation angle in the feature vector T, and $\bar{\theta}$ represents a true value of the rotation angle.

* * * * *